United States Patent [19]
Benker et al.

[11] Patent Number: 5,358,581
[45] Date of Patent: Oct. 25, 1994

[54] METHOD OF AND APPARATUS FOR APPLYING FLEXIBLE EXTENSIONS TO SECTIONS OF PHOTOGRAPHIC ROLL FILMS

[75] Inventors: Gerhard Benker, Pullach; Josef Gruber, Munich; Peter Lermann, Weyarn; Reinhard Nicko; Bernd Payrhammer, both of Munich; Manfred Schlechte, Neuried, all of Fed. Rep. of Germany

[73] Assignee: AGFA-Gevaert Aktiengesellschaft, Leverkusen, Fed. Rep. of Germany

[21] Appl. No.: 918,214

[22] Filed: Jul. 17, 1992

Related U.S. Application Data

[62] Division of Ser. No. 415,175, Sep. 29, 1989, abandoned.

[30] Foreign Application Priority Data

Oct. 4, 1988 [DE] Fed. Rep. of Germany ....... 3833730

[51] Int. Cl.$^5$ ............................................. B65H 69/02
[52] U.S. Cl. .................................. 156/157; 156/266; 156/353; 156/359
[58] Field of Search ............... 156/157, 159, 266, 353, 156/359

[56] References Cited

U.S. PATENT DOCUMENTS

| | | | |
|---|---|---|---|
| 4,080,242 | 3/1978 | Komenda et al. | 156/506 |
| 4,094,723 | 6/1978 | Jones | 156/353 |
| 4,643,783 | 2/1987 | Hogenson | 156/504 X |

Primary Examiner—David A. Simmons
Assistant Examiner—Paul M. Rivard
Attorney, Agent, or Firm—Darby & Darby

[57] ABSTRACT

Relatively short sections of photographic roll films (such sections can consist of a single film frame or of two or another small number of film frames) are provided with elongated strip-shaped extensions for convenient transport through a copying machine. Extensions are severed from the leader of a roll of convoluted flexible material having a width matching the desired length of an extension, and one end of a freshly severed extension is caused to overlap one end of a film section so that the extent of overlap is not more than the width of a frame line between two neighboring frames of a roll film. One side of each extension is fully coated with a layer of hotmelt, and the extension is sealed to the respective film section by a narrow elongated heating element which is moved against the overlapping ends of the film section and the properly oriented extension. The roll can be subdivided into wider or narrower extensions, depending upon the width of film sections which are to be connected with extensions.

7 Claims, 4 Drawing Sheets

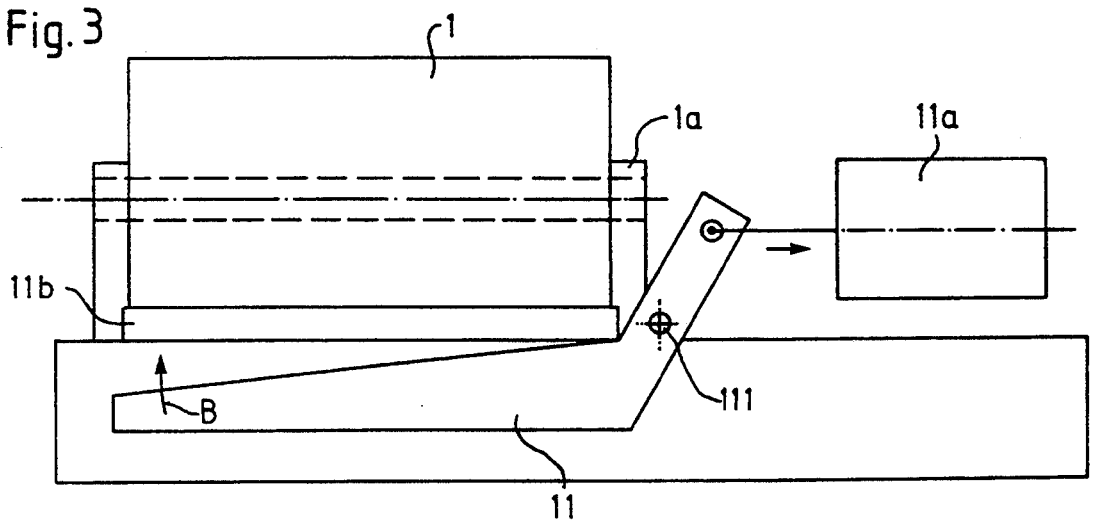
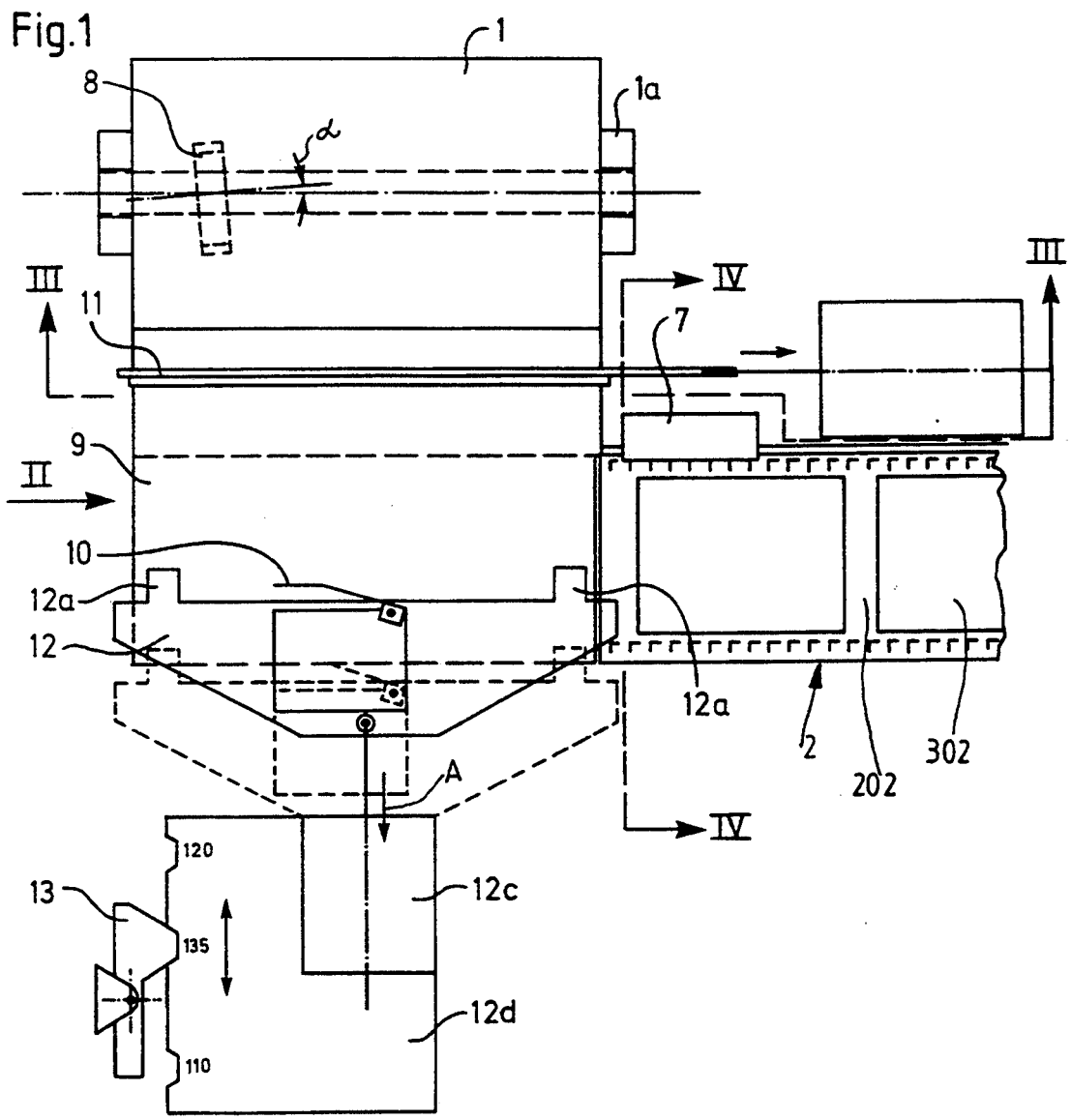

METHOD OF AND APPARATUS FOR APPLYING FLEXIBLE EXTENSIONS TO SECTIONS OF PHOTOGRAPHIC ROLL FILMS

This application is a division, of application Ser. No. 07/415,175, filed Sep. 29, 1989, now abandoned.

BACKGROUND OF THE INVENTION

The invention relates to improvements in methods of and in apparatus for manipulating sections of photographic films, particularly prior to the making of prints in copying machines.

Published German patent application No. 30 29 046 of Peters discloses a method of preparing sections of photographic roll films for reintroduction into a copying machine for the purpose of making additional or substitute prints on photographic paper or the like. Each section is provided with a lateral extension, and such lateral extensions are affixed to an elongated strip which is transported through the copying machine. A drawback of the proposal of Peters is that the copying machine must be provided with a specially designed copying platform, i.e., that the strip with film sections extending laterally therefrom cannot be transported through an existing machine without substantial modifications.

A modern copying machine for the making of prints on photographic paper or the like is normally equipped with a platform which carries a pair of film transporting rolls ahead of as well as a pair of advancing rolls behind the copying window. Such copying machine cannot be readily used for the making of copies of two or three or four film frames on short sections of photographic roll films or of a single film frame because the distance of the upstream pair of advancing rolls from the downstream pair of advancing rolls is or can be greater than the length of a single film frame or the combined length of a small number of frames. Therefore, copying machines of the just outlined character cannot be used for the making of prints from relatively short film sections, especially sections of photographic films having a series of small frames. This creates problems because a photographic laboratory which is equipped with a modern automatic copying machine must maintain in service a second machine which is capable of making prints from individual film frames irrespective of the format of such frames.

OBJECTS OF THE INVENTION

An object of the invention is to provide a novel and improved method of temporarily lengthening sections of exposed and developed photographic roll films so that such sections can be readily advanced through a modern high-speed automatic copying machine.

Another object of the invention is to provide a novel and improved method of making and applying flexible extensions to short or very short sections of photographic roll films preparatory to introduction of such film sections into a copying or other processing machine which can properly manipulate film sections only if their length at least matches a predetermined minimum length.

A further object of the invention is to provide a novel and improved flexible material which can be used for the making of extensions for attachment to sections of photographic films.

An additional object of the invention is to provide a novel and improved apparatus which can be used for the practice of the above outlined method.

Still another object of the invention is to provide an apparatus which is sufficiently versatile to apply extensions of requisite size to narrow, medium wide or wide film sections.

Another object of the invention is to provide the apparatus with novel and improved means for converting a supply of flexible material into a succession of discrete extensions of requisite width and length.

An additional object of the invention is to provide novel and improved means for manipulating short, medium long or longer film sections in the above outlined apparatus.

A further object of the invention is to provide novel and improved means for affixing extensions to sections of photographic films.

Another object of the invention is to provide novel and improved means for operating the components of the above outlined apparatus in an optimum sequence and at optimum intervals.

SUMMARY OF THE INVENTION

One feature of the present invention resides in the provision of a method of applying extensions to sections of photographic films of the type having a series of neighboring film frames with frame lines of predetermined width between neighboring frames. The method comprises the steps of placing a strip-shaped extension of flexible material which is coated with hotmelt in line with a film section so that one end of the extension overlaps with one end of the film section a distance at most matching the predetermined width of a frame line, and heat sealing the overlapping ends of the extension and film section to each other.

The hotmelt preferably forms a layer which fully overlies one side of the extension. The extension which is heat sealed to a film section has a width which closely approximates or matches the width of the film section. Thus, the width of extensions is selected to match the width of film sections which are to be provided with extensions.

The method can further comprise the steps of establishing and maintaining a supply of flexible material for conversion into extensions, withdrawing a length of flexible material from the supply, and severing the extension from the withdrawn length of flexible material. The width of flexible material which forms the supply preferably matches the desired length of extensions.

The method can further comprise the step of advancing the film section longitudinally along a predetermined path, monitoring the path for the presence of the leader and a lateral edge face of the film section in a predetermined portion of the path, generating at least one signal in response to detection of the leader and edge face of the film section in the predetermined portion of the path, and utilizing the at least one signal to place the extension in line with the film section, to sever the extension from the length of flexible material, and to initiate the heat sealing step. Still further, the method can comprise the step of holding the extension in line with the film section in the predetermined path in response to the at least one signal preparatory to the severing step.

The severing step can include separating the extension from the length of flexible material at a location in which the marginal portions of the severed extension are slightly offset with reference to the marginal portions of the film section in the predetermined path, and such method can further comprise the step of moving the extension to a position of full register of its marginal portions with the marginal portions of the film section in the predetermined path.

Another feature of the invention resides in the provision of an apparatus for applying extensions to sections of photographic films of the type having a series of neighboring frames with frame lines of predetermined width between neighboring frames. The apparatus comprises a source of flexible material having a layer of hotmelt and being subdivisible into extensions of selected width, guide means defining a first path for film sections, withdrawing means which is operative to draw flexible material from the source along a second path transversely of the first path, means for severing elongated extensions from withdrawn flexible material in such positions that one end of a severed extension overlaps with one end of a film section in the first path a distance which at most matches the width of a frame line, and means for heat sealing the ends of extensions to the ends of film sections.

The widthdrawing means can include at least one rotary friction wheel, and the source can comprise means for supporting a supply (such as a roll) of convoluted flexible material in such position that the outermost convolution of flexible material rests on the at least one friction wheel. The orientation of the roll of convoluted flexible material is preferably such that the axes of the roll and the at least one rotary friction wheel make a small acute angle.

The apparatus can further comprise means for terminating the operation of the withdrawing means, and such operation terminating means can include signal generating means for monitoring the second path for the presence of flexible material. The monitoring means generates signals in response to detection of flexible material in a preselected portion of the second path, and such apparatus preferably further comprises means for advancing flexible material a predetermined distance along the second path in response to signals from the monitoring means. The severing means and the heat sealing means are responsive to signals from the aforementioned monitoring means or from additional monitoring means to respectively sever extensions from advanced flexible material and to heat seal such extensions to film sections in the first path. The advancing means can include means for advancing flexible material through different distances so that the severing means can separate from flexible material extensions having different widths, depending upon the width of film sections in the first path.

The apparatus can further comprise signal generating detector means for monitoring a predetermined portion of the first path for the presence of the leader and a lateral edge face of a film section, and means for operating the widthdrawing means, the severing means and the heat sealing means in a predetermined sequence in response to signals from the detector means. Means for temporarily clamping film sections in the first path can be provided to clamp a film section when such film section has induced the detector means to generate one or more signals, i.e., when the film section is in a proper position to be overlapped by an extension in such a way that the extent of overlap is not more than the width of a frame line.

The heating means can include a carrier (such as a pivotable arm), an elongated heating element (e.g., a piece of wire or metallic strip material) on the carrier, and means (e.g., a magnet) for moving the heating element to and from a position in which the heating element extends transversely of and across the first path to heat seal the overlapping ends of an extension and a film section to each other. Resilient cushioning means can be installed between the carrier and the heating element.

The apparatus can further comprise means (e.g., a printer) for applying indicia (such as encoded or non-encoded serial numbers) to flexible material in the second path.

A further feature of the invention resides in the provision of a web of flexible material which can be subdivided into extensions and comprises a flexible substrate (e.g., a substrate consisting of paper having a weight of approximately 90 g/m$^2$), and a layer of hotmelt which fully overlies one side of the substrate. The hotmelt can be a mixture of at least one paraffin, at least one polymer and at least one resin. Such hotmelt preferably has a melting point which is well below the melting point of the layer of gelatine on a photographic roll film, i.e., normally below 180° C. The presently preferred range of melting points is between 100° and 120° C.

A layer of friction reducing material (e.g., a material which contains silicon) can be applied to the other side of the substrate.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

BRIEF DESCRIPTION OF THE DRAWING

FIG. 1 is a schematic plan view of an apparatus which embodies one form of the invention;

FIG. 3 is a sectional view substantially as seen in the direction of arrows from the line III—III in PIG. 1;

DESCRIPTION OF PREFERRED EMBODIMENTS

Figure 4:
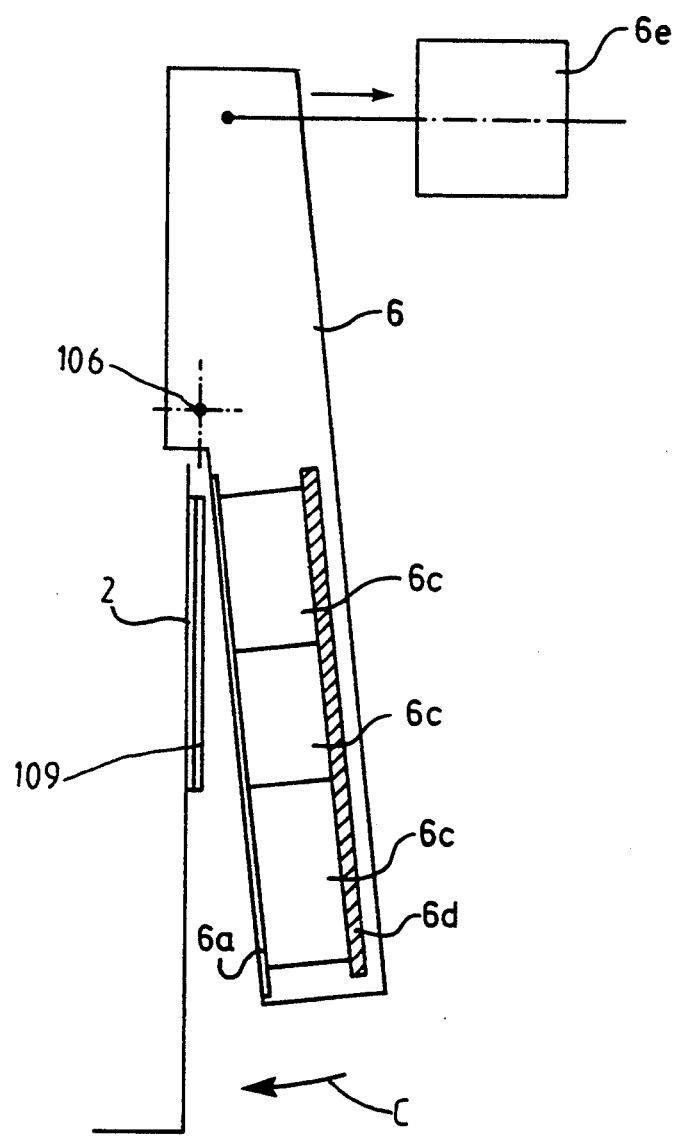
FIG. 4 is a fragmentary sectional view substantially as seen in the direction of arrows from the line IV—IV of FIG. 1.

The apparatus which is shown in FIGS. 1 to 5 comprises a housing or main support 14 which can carry all components of the apparatus and can contain the controls therefor. The housing 14 is provided or connected with a pair of bifurcated brackets 1a at the locus of a source of flexible material 9 in the form of a roll 1. The core for convoluted flexible material 9 is vertically movably guided between the prongs of the brackets 1a in such a way that the outermost convolution of flexible material 9 rests on a rotary withdrawing member in the form of a friction wheel 8. The flexible material 9 can comprise a substrate 209 of paper (FIG. 6) having a weight of approximately 90 g/m$^2$ and having one of its sides completely coated with a layer 309 of hotmelt. For example, the hotmelt can contain at least one paraffin, at least one polymer and at least one resin. Such hotmelts are available on the market. The melting point of the layer 309 of hotmelt at one side of the substrate 209 of the flexible material 9 should be well below the melting point of the layer of gelatin on a standard photographic film. As a rule, the melting point of gelatin on photographic roll films is abut 180° C. and the melting point of hotmelt of the flexible material 9 is well below such temperature, preferably between 100° and 120° C. This temperature range is desirable and advantageous on the additional ground that the substrate 209 of the flexible material 9 undergoes no deformation or undergoes a minimum of deformation when heated to 100°-120° C.

In order to ensure that the extensions 109 which are made from flexible material 9 can readily advance through a copying machine as well as toward and beyond the heat sealing station (best shown in FIG. 5), the other side of the substrate 209 of the flexible material 9 is preferably provided with a layer 409 of friction reducing material, for example, a layer which contains silicon.

The depth of slots between the prongs of U-shaped brackets 1a for the roll 1 of flexible material 9 is selected in such a way that the outermost convolution of the roll continues to rest on the friction wheel 8 irrespective of the diameter of convoluted flexible material on the core of the roll 1. The friction wheel 8 can be driven by a motor 108, and its axis makes with the axis of the roll 1 a small acute angle alpha of a few degrees. The means for turning off the motor 108 for the friction wheel 8 comprises a monitoring device 10 in the form of a deformable sensor which can generate signals when it detects the leading edge of flexible material 9. The upper side of the housing 14 defines for the flexible material 9 a path which extends transversely of the path for insertion of successive film sections 2 (counter to the direction of arrow II). When the signal from the sensor 10 initiates a stoppage of the motor 108, the leader of flexible material 9 is located between the claws or jaws of an advancing device 12a which can advance flexible material in the direction of arrow A through one of several different distances, depending upon the width of the film section 2 which is to be bonded to a freshly formed extension 109, i.e., to the separated portion of the leader of flexible material 9 which was drawn off the roll 1 by the friction wheel 8. The advancing or clamping device 12a is mounted on a carriage 12 which is movable back and forth in and counter to the direction of arrow A and can be arrested in any one of, for example, three different positions by a detent member 13. The carriage 12 supports the advancing device 12a, the sensor 10 and a magnet 112 which serves to open and close the claws or jaws of the advancing device 12a. A magnet 12c which is adjacent the path of movement of flexible material 9 can pull the carriage 12 in the direction of arrow A, together with a magnetic plate 12d having notches for the tooth-shaped pallet of the detent member 13. The latter is a lever or pawl which is pivotable in clockwise and counterclockwise directions, as seen in FIG. 1, i.e., into and from a selected notch of the plate 12d. The notches of the plate 12d are identified by numerals "110", "120" and "135" denoting three standard film sizes.

Slight inclination of the axis of the friction wheel 8 relative to the axis of the roll 1 is desirable and advantageous because this ensures that the right-hand marginal portion of the unwound length of flexible material 9 slides along a suitable guide (e.g., along the right-hand bracket 1a of FIG. 1) in order to ensure that the flexible material 9 invariably advances along a predetermined path and can be properly engaged by the jaws or claws of the advancing device 12a before the carriage 12 is set in motion in the direction of arrow A.

Figure 2:
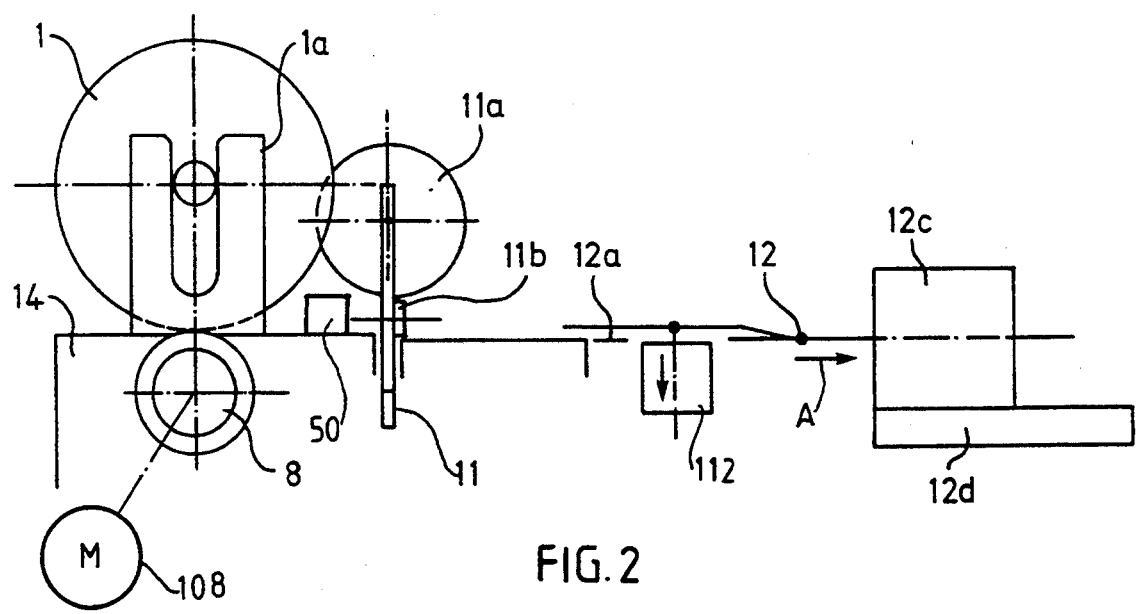
FIG. 2 is an elevational view substantially as seen in the direction of arrow II in FIG. 1.

The means for severing the leader of flexible material 9 when the latter is advanced by the device including the carriage 12 to an extent which is determined by the timing of penetration of the pallet of detent member 13 into the adjacent notch of the plate 12d is shown in FIGS. 1 to 3. The illustrated severing means comprises a knife 11 which is pivotable at 111 in and counter to the direction of arrow B. The means for operating the knife 11 comprises a magnet 11a on the housing 14, and the cutting edge of the knife 11 cooperates with a stationary counterknife 11b. The magnet 11a is preferably designed to rapidly pivot the knife 11 in the direction of arrow B in order to sever the flexible material 9 in a plane adjacent the counterknife 11b, and to thereupon rapidly return the knife 11 to the retracted position of FIG. 3. As can be seen in FIG. 3, the severing action is selected in such a way that the cutting edge of the knife 11 begins to sever flexible material 9 adjacent to one marginal portion and severs it toward the other marginal portion.

Figure 5:
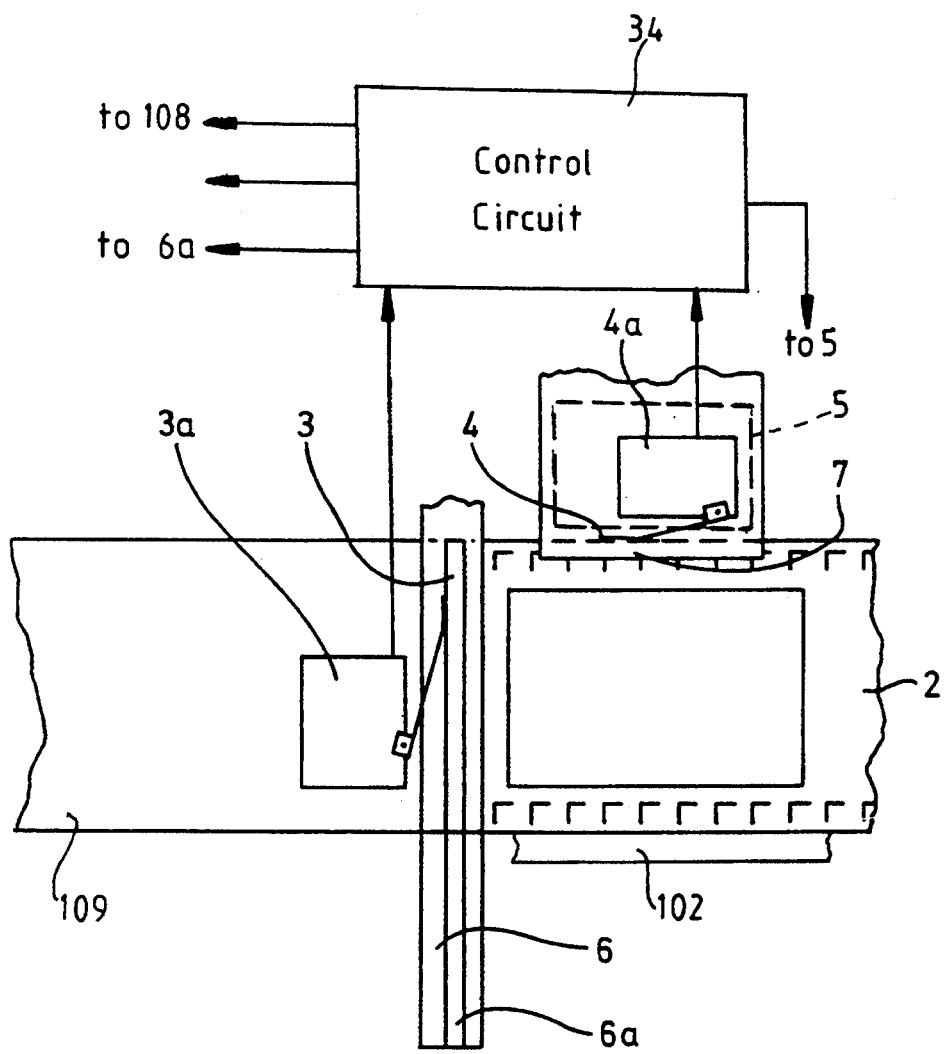
FIG. 5 is an enlarged view of a detail in the apparatus of FIG. 1.
Figure 6:
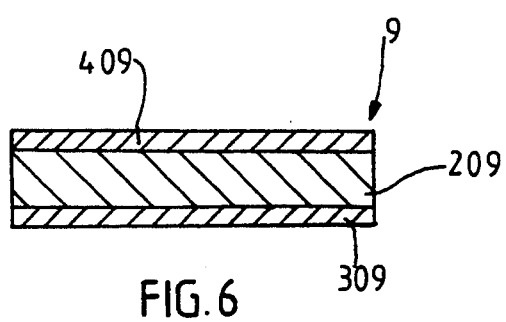
FIG. 6 is a sectional view of a web of flexible material which can be used for the making of extensions.

FIG. 5 shows elongated guide means 102 defining for successive film sections 2 an elongated path which extends transversely of the path (arrow B) for flexible material 9. The housing 14 supports two detectors 3 and 4. The detector 3 generates a signal in response to detection of the leader of a film section 2 by actuating a microswitch 3a. The detector 4 generates a signal in response to detection of the adjacent lateral edge face of the film section 2 by closing or otherwise actuating a microswitch 4a. The film section 2 can be transported by hand or by a suitable drive, not shown. The microswitches 3a and 4a are connected in series and constitute elements of a control circuit 34 which controls the operation of various mobile components or units of the improved apparatus in a predetermined sequence. The circuit D4 may be a microprocessor, for example one delivered by Intel under No. 8085, end initiates such movements of various components when the detectors 3, 4 ascertain that the film section 2 in the guide means 102 has assumed a predetermined position which is best suited for heat sealing of an extension 109 thereto.

FIG. 5 further shows a hold-down device 7 which serves to clamp and retain the film section 2 in an optimum position (in which the microswitches 3a and 4a are actuated by the respective detectors 3 and 4) for bonding to an extension 109. The hold-down device 7 can be caused to clamp the film section 2 by an electromagnet 5 in response to a signal from the control circuit 34.

Certain details of a presently preferred heat sealing device are shown in FIG. 4. This device comprises an elongated carrier 6 which is an arm pivotable at 106 by an electromagnet 6e. The arm 6 carries an elongated heating element 6a (e.g., a length of flattened resistance heating wire) mounted on a series of segments 6c forming part of or attached to the arm 6. The heating element 6a extends transversely of and across the path for flexible material 9 and can seal one end of a freshly formed extension 109 to the adjacent partly overlapped or overlapping end of a film section 2 by heating the respective portion of the layer of hotmelt to requisite temperature. That side of the extension 109 which is coated with hotmelt overlies the adjacent end of the film section 2 in the guide means 102 while such film section engages the detectors 3 and 4. It is presently preferred to employ a heating element 6a which is a flat piece of metallic wire or strip material having a rectangular cross-sectional outline. The maximum width of the heating element 6a is less than, or at most matches, the width of frame lines 202 between neighboring frames 302 of a photographic roll film. It is preferred to coat the heating element 6a with a layer of material, such as TEFLON (trademark), which does not tend to adhere to hotmelt. The segments 6c which carry the heating element 6a are mounted on an elastic cushion 6d of the arm 6. The segments 6c can serve as a means (or can carry means) for preheating the heating element 6a. The width of each of the three illustrated segments 6c corresponds to that of one of No. 120, 135, 110 photographic roll films.

The mode of operation of the improved apparatus is as follows:

The width of flexible material 9 corresponds to the desired length of an extension 109. This is of advantage because a single roll 1 of flexible material can be used for the making of extensions 109 which can be connected to photographic films Nos. 110, 120 or 135.

A film section 2 which is to be connected with an extension 109 is inserted into and transported along the guide means 102 until the detectors 3 and 4 actuate the respective microswitches 3a and 4a. This causes the control circuit 34 to initiate the operation of various mobile components of the apparatus in a predetermined sequence. The first step which is carried out in response to a signal from the control circuit 34 preferably includes energization of the electromagnet 5 which causes the hold-down device 7 to clamp the film section 2 in an optimum position for splicing to an extension 109. The next step (or a step which is carried out simultaneously with energization of the electromagnet 5) can involve preheating of the heating element 6a in a manner which is well known in the art and need not be described here. As stated above, the segments 6c can form means for preheating the heating element 6a.

The next step involves starting of the motor 108 which causes the friction wheel 8 to unwind a length of flexible material 9 from the roll 1 so that the leader of the material 9 advances toward and causes the sensor 10 to arrest the motor 108. Moreover, the signal from the sensor 10 causes the magnet 112 to actuate the advancing device 12a which engages the leader of flexible material 9 and advances it in the direction of arrow A in response to energization of the magnet 12c. When the pallet of the detent member 13 enters the appropriate notch of the plate 12d, the movement of flexible material 9 in the direction of arrow A is interrupted and the signal from sensor 10 thereupon causes (i.e., with a proper delay) energization of the magnet 11a which pivots the knife 11 so that the latter separates an extension 109 from the leader of flexible material 9. The severing step takes place at a time when the width of that portion of the leader of flexible material 9 which has advanced beyond the severing plane equals or closely approximates the width of film section 2 in the guide means 102. The advancing device 12a continues to grip and properly locate the freshly formed extension 109 after the severing step is completed, namely during actual bonding of one end of the extension 109 to one end of the film section 2. At such time, the layer 309 of hotmelt is located at the underside of the extension 109 and overlies the adjacent end of the film section 2 which is clamped to the guide means 102 by the hold-down device 7.

In the meantime, the temperature of the heating element 6a has risen to an optimum value (.e.g., 110° C.) for bonding of the ends of extension 109 and film section 2 to each other. The magnet 6e is then energized to pivot the arm 6 in the direction of arrow C whereby the heating element 6a moves toward and seals the overlapping ends of the film section 2 and extension 109 to each other. The segments 6c maintain the heating element 6a in an optimum position for predictable heating of hotmelt in the region between the overlapping ends of the film section 2 and extension 9. The elastic cushion 6d ensures that the heating element 6a assumes an optimum position for the heating of entire overlapping ends of a film section and an extension irrespective of the width of the film section and extension, i.e., also when the section 2 forms part of a film No. 120 of maximum width, The temperature of the heating element 6a is or can be selected and regulated in such a way that the entire overlapping end of the extension 109 is adequately bonded to the entire overlapped end of the film section 2 in the guide means 102. This can be readily achieved by regulating the temperature of the heating element 6a (.e.g., by appropriate selection of the interval of preheating the element 6a) and/or by appropriate selection of the interval of contact between the heating element and the overlapping end of the extension 109. The spliced-together film section 2 and extension 109 can be removed as soon as the arm 6 retracts the heating element 6a or after a required interval of cooling of the freshly formed bond. All that counts is to ensure that the bond can withstand the forces which tend to separate the extension 109 from the film section 2 during removal of the parts 2, 109 from the film section 2 during removal of the parts 2, 109 from the guide means 102 and/or during transport through a copying machine.

If desired, the combination of parts including a film section 2 and an extension 109 which is already bonded to the film section can be reinserted into the guide means 102 or can be moved in the guide means 102 to a position in which a second extension can be bonded to the other end of the film section 2. This renders it possible to increase the overall length of the part (including a film section and two extensions) which is to be transported through a copying machine.

It is further within the purview of the invention to operate the advancing device and to position the severing means in such a way that an extension 109 is separated from the leader of flexible material 9 before it assumes a position of full end-to-end alignment with the film section 2 in the guide means 102, and the advancing means is thereupon actuated to move each of the two longitudinally extending marginal portions of the freshly formed extension 109 into full register with the respective marginal portions of the film section 2 in the guide means 102.

An important advantage of the improved method and apparatus is that the width of a combination of a film section 2 and one or two extensions 109 does not exceed the width of the film section alone. This renders it possible to transport such articles through a modern automatic copying machine with a pair of advancing rolls at each side of the copying window.

An advantage of a flexible material 9 one side of which is fully coated with a hotmelt is that the end of an extension which overlies an end of a film section invariably contains a layer of hotmelt in contact with the material of the film section to ensure the establishment of a reliable bond.

The width of the bonded-together portions of a film section and an extension can be much less than the width (normally approximately 2 mm) of frame lines in narrowest photographic roll films (such as Nos. 110 and 135). It has been found that the width of the bond between the ends of an extension and a film section need not exceed 1 mm and can be much less (e.g., 0.5 mm). This ensures that the film frame 302 which is adjacent the bond is not affected by the temperature of the heating element 6a. Moreover, the extension or extensions can be readily separated from the respective film section when the copying operation is completed; all that is necessary is to exert a certain force which suffices to destroy the bond but does not affect the appearance and/or other desirable characteristics of the adjacent film frame(s). All this is due to the fact that the width of the bond is not more than the width of a frame line on the respective film, section. Detachment of an extension from the film section can take place in such a way that remnants of hotmelt do not adhere to the film section.

Film sections which are to be treated in the apparatus of the present invention can constitute entire films, short sections having a single film frame, or somewhat longer sections each of which has a series of for example four or six film frames of a length which is preferred for insertion into customer envelopes in photographic film processing laboratories.

The character 50 denotes a standard printer which can be used adjacent the path for flexible material 9 to provide it with information (e.g., serial numbers), for example, one for each extension 109. Such information can be used to identify the respective film sections 2 for insertion into proper customer envelopes.

A copying machine with a pair of advancing rolls ahead of and with a pair of advancing rolls behind the copying window is disclosed, for example, in commonly owned U.S. Pat. No. 4,627,719 granted Dec. 9, 1986 to AGFA-GEVAERT.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. For use in a photographic copying machine wherein spaced apart transporting means advance a photographic film past a copying window, a method of extending the length of a section of photographic film which otherwise would not be properly engaged by said transporting means, said sections of photographic films having a series of neighboring frames with frame lines of predetermined width between neighboring frames, comprising the steps of placing a strip-shaped extension of flexible material which is coated with hotmelt in line with a film section so that one end of the extension overlaps with one end of the film section a distance at most matching said predetermined width; and heat sealing the overlapping ends of the extension and film section to each other by applying heat to said overlapping ends in an area no wider than said predetermined width while maintaining the remaining area of said extension substantially non-adhesive.

2. The method of claim 1, wherein the hotmelt forms a layer which fully overlies one side of the extension.

3. The method of claim 1 of applying extensions to film sections having a predetermined width, wherein the extension which is heat sealed to the film section has a width at least approximating said predetermined width.

4. The method of claim 1, further comprising the steps of establishing and maintaining a supply of flexible material, withdrawing a length of flexible material from the supply in a direction transverse to the direction in which said transporting means advances said film, the width of said flexible material being substantially equal to the length of said extension and severing the extension from the withdrawn length of flexible material.

5. The method of 4, further comprising the steps of positioning the film section longitudinally in a predetermined path, monitoring the path for the presence of the leader and a lateral edge face of the film section in a predetermined portion of the path, generating at least one signal in response to detection of the leader and edge face of the film section in the predetermined portion of the path, and utilizing said at least one signal to place the extension in line with the film section, to sever the extension from the length of flexible material, and to initiate said heat sealing step.

6. The method of claim 5, further comprising the step of holding the extension in line with the film section in said path in response to said at least one signal preparatory to said severing step.

7. The method of claim 5, wherein said severing step includes separating the extension from the length of flexible material at a location in which the marginal portions of the severed extension are slightly offset with reference to the marginal portions of the film section in said path, and further comprising the step of moving the marginal portions of the extension to positions of full register with the marginal portions of the film section in said path.

* * * * *